United States Patent [19]
Smith

[11] 4,378,516
[45] Mar. 29, 1983

[54] PINCUSHION CORRECTION IN A DUAL DEFLECTION CRT SYSTEM

[75] Inventor: Freeman E. Smith, Tempe, Ariz.
[73] Assignee: Motorola Inc., Schaumburg, Ill.
[21] Appl. No.: 289,004
[22] Filed: Jul. 31, 1981
[51] Int. Cl.³ .............................................. H01J 29/56
[52] U.S. Cl. .................................................... 315/370
[58] Field of Search .................... 315/371, 370, 396 R, 315/311

[56] References Cited

U.S. PATENT DOCUMENTS

| | | |
|---|---|---|
| Re. 28,631 | 11/1975 | Waehner et al. . |
| 3,308,334 | 3/1967 | Bryson . |
| 3,403,289 | 9/1968 | Garry . |
| 3,422,305 | 1/1969 | Infante . |
| 3,422,306 | 1/1969 | Gray . |
| 3,487,164 | 12/1969 | Eggert . |
| 3,763,393 | 10/1973 | White . |
| 3,823,338 | 7/1974 | Garrett . |
| 3,825,796 | 7/1974 | Bello . |
| 4,101,813 | 7/1978 | Parker et al. . |
| 4,203,051 | 5/1980 | Hallett et al. . |

*Primary Examiner*—Theodore M. Blum
*Attorney, Agent, or Firm*—Eugene A. Parsons

[57] ABSTRACT

Correction of pincushion distortion in a dual deflection CRT display system is achieved by applying identical correction functions to a major deflection signal and a combined deflection signal and by substracting the corrected major deflection signal from the corrected combined deflection signal. A particular circuit performs this correction method through the novel interconnection of two standard pincushion correction modules. This circuit is essentially transparent to the remainder of a display system and is adaptable to any CRT display within the operating range of the correction modules. Furthermore, the disclosed circuit is simple in design and construction, thus entailing the addition of little hardware to an existing system.

6 Claims, 4 Drawing Figures

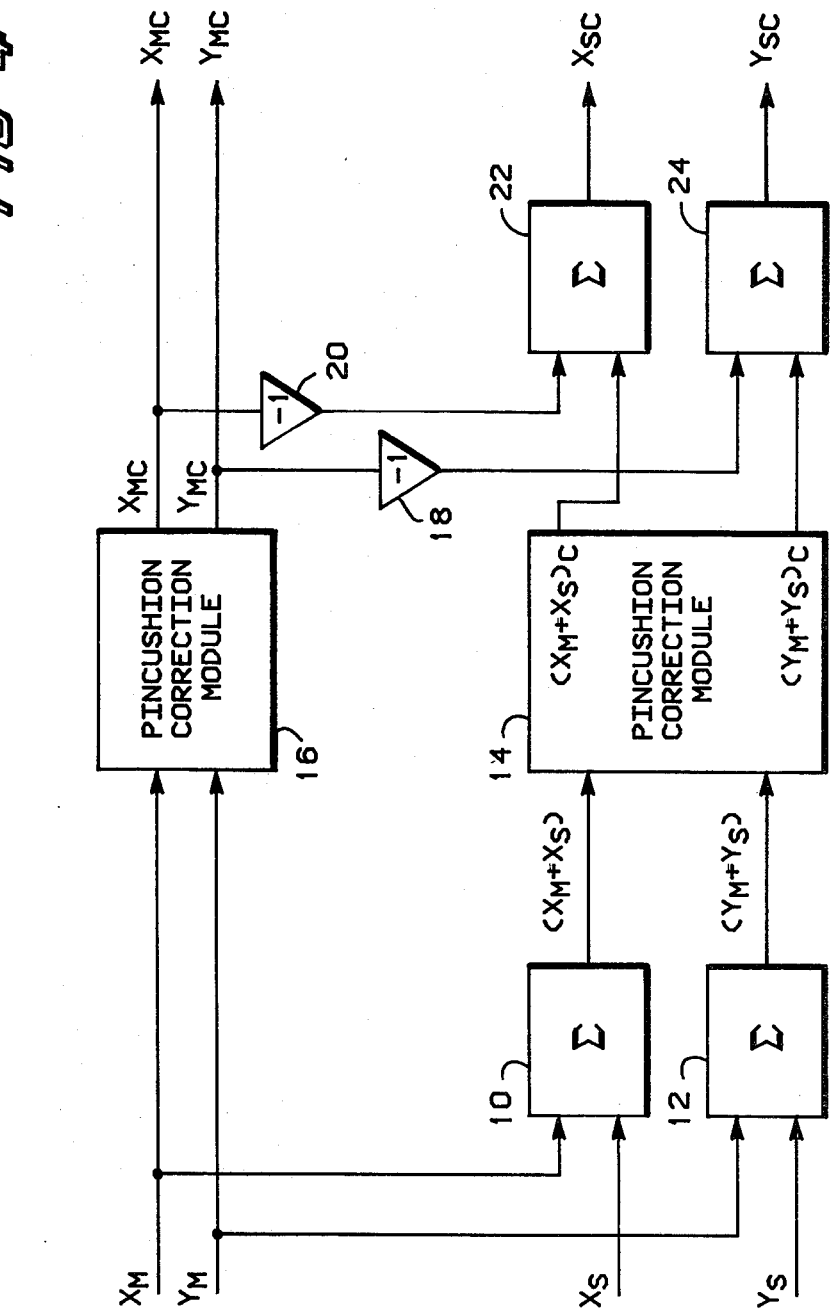

PINCUSHION CORRECTION IN A DUAL DEFLECTION CRT SYSTEM

BACKGROUND OF THE INVENTION

The present invention relates generally to display apparatus of the type employing cathode ray tubes (CRT's). More particularly, the invention relates to pincushion distortion correction in display systems using separate major and minor deflection signals.

CRT display systems are well known for presenting a wide range of information to a viewer. In its simplest form, a CRT comprises an electron gun, a surface which emits visible light when struck by electrons and a system of coils and or plates for focusing and directing the electrons onto the sensitive surface. When presenting a pattern on a relatively flat-faced CRT using magnetic deflection, the phenomenon of pincushion distortion is commonly encountered. This geometric phenomenon has resulted in commercially available pincushion correction modules which accept linear deflection signals, predistort them prior to final amplification, and produce a linear pattern on the CRT face.

Commercially available pincushion correction modules are attractive for several reasons, such as relatively small size and ease of use. Primarily, however, these modules represent a solution to a design problem which need not drastically alter the remainder of the display system. These modules are usually adjustable for the geometry of the system in which they are used, so for practical purposes they represent a "black box" solution to pincushion distortion which is transparent to the remainder of the display system.

In systems wherein some or all of the information to be displayed consists of letters, numbers and other symbols the electronics needed to generate the deflection signals are sometimes divided into two separate systems. One system, the major deflection system, comprises low frequency, high power circuits to generate the signals which grossly position the electron beam on the CRT face. The second system, the symbol or minor deflection system, comprises high frequency, low power circuits to generate the signals which direct the electron beam to "draw" a particular character. The use of two separate systems is motivated, in part, by the desire to avoid the use of circuit components which are capable of performing at high power and high bandwidth.

Correction of pincushion distortion in such dual deflection systems is possible by several methods. The primary requirement is that the correction applied to the minor deflection signal must be a function of the gross position of the symbol on the CRT face. Commercial pincushion correction modules may be used in single deflection systems. This is analogous to combining the major and minor deflection signals of a dual deflection system into a single deflection signal, then inputting the combined signal to a correction module and applying the resulting signal to a single system of amplifiers and coils. This method discards many of the advantages of a dual deflection system, however. Another method is described in U.S. Pat. No. 3,403,289, Distortion Correction System For Flying Spot Scanners, issued Sept. 24, 1968 to Gerald A. Garry. This method applies the uncorrected major deflection signals to two different correction circuits. The first correction circuit produces a correction for the major deflection signal and the second produces a signal which is input to the minor deflection signal generating circuits to produce a corrected minor deflection signal. This system requires specialized correction modules and minor deflection signal generators. In a third method, described in U.S. Pat. No. 3,487,164, Display Apparatus Deflection Signal Correction System With Signal Multiplication, issued Dec. 30, 1969, to C. A. Eggert, the corrected major deflection signals are analog multiplied with the uncorrected minor deflection signals and the results are summed to produce a corrected minor deflection signal. This method does not apply a separate correction function to the minor deflection signal. It is also possible to correct pincushion distortion by the placement of permanent magnets so as to form the proper fields to deflect the electron beam.

SUMMARY OF THE INVENTION

It is an object of the present invention to provide an improved pincushion correction method for use in dual deflection CRT display systems.

It is a further object to provide pincushion correction for both major and minor deflection signals using standard pincushion correction modules.

Yet a further object is to provide an improved pincushion correction circuit which is transparent to the remainder of the display system.

The present invention provides a first standard correction module to which a combination of the major and minor deflection signals is applied. The result is a corrected combined deflection signal which would be suitable for driving a single deflection CRT. A second standard correction module is used to produce a corrected major deflection signal alone. The corrected major deflection signals are applied to the proper amplifiers and coils and are also subtracted from the output of the first correction module, the result being corrected major deflection signals.

These and other objects of this invention will become apparent to those skilled in the art in consideration of the accompanying detailed description and drawings.

BRIEF DESCRIPTION OF THE DRAWINGS

FIG. 4 is a block diagram of a correction circuit according to the present invention.

DETAILED DESCRIPTION OF THE INVENTION

Figure 1:
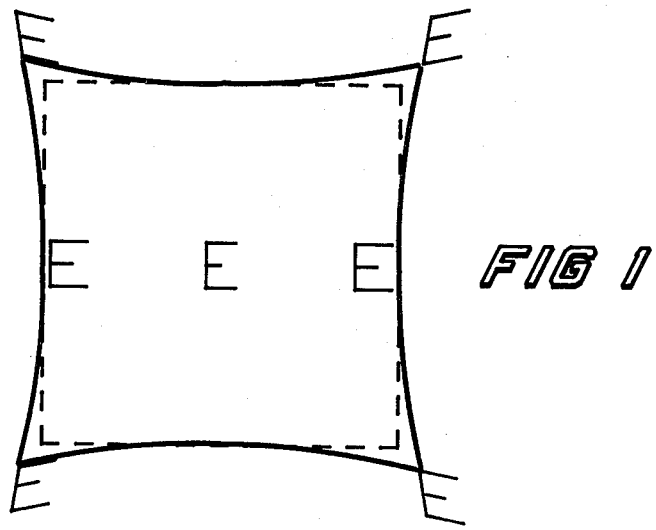
FIG. 1 represents a dual deflection CRT display using uncorrected major and minor deflection signals.

FIG. 1 demonstrates the effects of pin cushion distortion on the gross position and the shape of symbols on the CRT face. Pin cushion distortion arises when the radius of curvature of the face of the CRT does not coincide with the deflection throw-distance of the electron beam. As is shown by the dashed square and the solid figure of FIG. 1, the gross position, which is determined by the major deflection signal, is nearly identical, in both cases, along the horizontal and vertical (or X and Y) axes. That is, a major deflection signal which is intended to produce the dashed square actually produces the solid figure and the two figures coincide, or nearly so, along the X and Y axes. In the corners of the CRT face, however, the major deflection signal produces a much distorted figure. The effect on the minor deflection is shown by the character E shown in several locations on the CRT face. At the center of the face the character is undistorted. Along the axes the minor deflection is subject to an increasing sensitivity function. In other words, the horizontal legs of the E become longer as the character is displaced along the horizontal axis. In addition to this, the E becomes slanted as it is displaced toward the corners of the CRT.

Commercially available pincushion correction modules usually accept two uncorrected deflection signals, each corresponding to deflection along one of the two axes, and produce corrected deflection signals. The corrections applied may be very simple or extremely sophisticated. For example, one commercially available module applies a correction described by:

$$X_C = K_1 X - K_2 X [X^2 + Y^2 + K_3{}^2 - K_3]$$

$$Y_C = K_1 Y - K_2 Y [X^2 + Y^2 + K_3{}^2 - K_3]$$

where X and Y are uncorrected signals, $X_C$ and $Y_C$ are corrected signals and $K_1$, $K_2$, and $K_3$ are constants. This correction function is typical of those applied by commercial correction modules.

Figure 2:
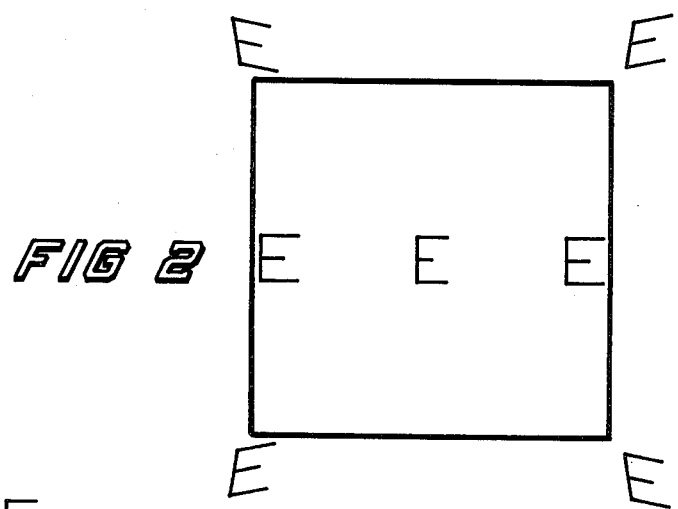
FIG. 2 represents a dual deflection CRT display utilizing corrected major deflection signals and uncorrection minor deflection signals.
Figure 3:
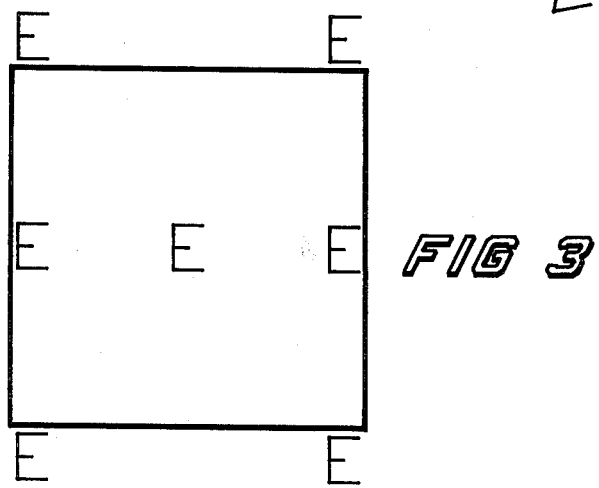
FIG. 3 represents a dual deflection CRT display utilizing fully corrected deflection signals.

FIG. 2 demonstrates the effect of correcting the major deflection signal through some correction function. The signal intended to produce a square image is now corrected to do so, but the characters are still slanted and the increasing sensitivity function still effects the size of the characters. FIG. 3 demonstrates the effect of correcting both the major and the minor deflection signals. The characters are now in the proper position, are upright and are the proper size.

Referring to FIG. 4, a block diagram of a correction circuit in accordance with the present invention is shown. As shown, the circuit accepts first and second major deflection signals $X_M$ and $Y_M$ which correspond to the intended deflections along the two axes. Also, first and second minor deflection signals $X_S$ and $Y_S$ are accepted. The ratio between the major deflection signals and the minor deflection signals will typically be in the range from 20:1 to 100:1. This is because the major deflection signal must deflect the beam by a larger amount than the minor deflection signal. For instance, a 10 inch CRT face displaying symbols one-eight inch high will produce a ratio up to 80:1.

First major deflection signal $X_M$ and first minor deflection signal $X_S$ are the inputs of a first summing circuit 10 which forms a first summed or combined signal. Summing circuit 10 must not distort the pre-existing ratio between the major and minor deflection signals. As will be seen later, it is important that the combined signal is approximately equal to the major deflection signal. A summing circuit 12 similarly combines second major deflection signal $Y_M$ and second minor deflection signal $Y_S$ and produces a second combined signal. Summing circuits 10 and 12 may be of any form familiar in the art, as long as the ratio between the major and minor signals is not distorted. The first and second combined signals are input to a pincushion correction module 14. For example, module 14 may be of the type available from Intronics. Correction module 14 applies a non-linear correction function to the first and second combined signals and produces first and second corrected combined signals as shown. The corrected combined signals could be applied to the deflection coils of a single deflection CRT after amplification, as has been done in the prior art. This, however, abandons the advantages of a dual deflection system.

A second pincushion correction module 16 accepts first and second major deflection signals $X_M$ and $Y_M$ and applies a non-linear correction function which is substantially identical to the function applied by correction module 14. Module 16 produces first and second corrected major deflection signals $X_{MC}$ and $Y_{MC}$ which are two of the outputs of the correction circuit. The fact that the correction function applied by modules 14 and 16 is non-linear requires that the first and second combined signals are approximately equal to the first and second major deflection signals. As long as this approximation is good, then the correction applied by module 16 is approximately equal to the correction applied by module 14. Thus, the difference between a combined correction signal and a corrected major deflection signal is a properly corrected minor deflection signal. This approximation breaks down near the center of the CRT face where the major deflection signals are small. This is compensated for by the fact that the correction function has a relatively small value near the center of the CRT face. First corrected major deflection signal $X_{MC}$ is applied to an inverter 20 which merely changes the sign of the signal without changing the absolute value. The output of inverter 20 and the first combined corrected applied to an inverter 20 which merely changes the sign of the signal without changing the absolute value. The output of inverter 20 and the first combined corrected signal from pincushion correction module 14 are applied to a summing circuit 22. As long as the correction function applied by module 14 to the combined signals and by module 16 to the major deflection signals are nearly identical the output of summing circuit 22 will be a first corrected minor deflection signal $X_{SC}$. Similarly, second correction major deflection signal $Y_{MC}$ is applied to an inverter 18 and the output is applied with the second combined corrected signal to a summing circuit 24 which produces a second corrected minor deflection signal $Y_{SC}$.

The correction circuit described above is transparent to the remainder of the CRT display system since it simply accepts uncorrected deflection signals and produces corrected ones, thus requiring no major modification of an existing dual deflection system. Furthermore, the correction circuit uses only simple and well known components such as summing circuits 10, 12, 22 and 24 and inverters 18 and 20 together with standard correction modules 14 and 16. The function of the circuit does not depend on the particular correction modules chosen, only that the two are substantially identical.

In general, pincushion correction modules are adjustable to provide the proper correction function according to the geometry of each CRT. The alignment of the correction circuit according to the present invention is easily accomplished by defeating the minor deflection system and adjusting module 16 until an undistorted pattern such as the square of FIG. 2 is produced. Then the minor deflection system is activated and module 14 is adjusted until the major deflection signal components in the corrected minor deflection signals are nulled.

While the invention has been particularly shown and described with reference to a preferred embodiment thereof, it will be understood by those skilled in the art that various other modifications and changes may be made to the present invention from the principals of the invention described above without departing from the spirit and scope thereof.

What is claimed is:

1. A CRT display system having first and second major deflection signals and first and second minor deflection signals wherein the improvement comprises:
   first means for combining the first major deflection signal and the first minor deflection signal to produce a first combined signal;
   second means for combining the second major deflection signal and the second minor deflection signal to produce a second combined signal;
   first correction means responsive to said first and second combined signals for producing first and second corrected combined signals;
   second correction means responsive to the first and second major deflection signals for producing first and second corrected major deflection signals;
   third means for combining said first corrected combined signals and said first corrected major deflection signal to produce a first corrected minor deflection signal; and
   fourth means for combining said second corrected combined signal and said second corrected major deflection signal to produce a second corrected minor deflection signal.

2. The system according to claim 1 wherein each said first and second correction means comprises a standard pincushion correction module.

3. The system of according to claim 1 wherein each of said first and second means for combining comprises:
   a summing circuit.

4. The system according to claim 1 wherein each of said third and fourth means for combining comprises:
   an inverter; and
   a summing circuit.

5. A method of correcting pincushion distortion in a dual deflection CRT display system comprising the steps of:
   summing a first major deflection signal and a first minor deflection signal to produce a first summed signal;
   summing a second major deflection signal and a second minor deflection signal to produce a second summed signal;
   correcting said first and second summed signals according to a predetermined correction function;
   correcting said first and second major deflection signals according to a correction function substantially identical to said predetermined correction function;
   subtracting said first corrected major deflection signal from said first corrected summed signal; and
   subtracting said second corrected major deflection signal from said second corrected summed signal.

6. A pincushion correction circuit for a dual deflection CRT display system, comprising:
   a first summing circuit having inputs being a first major deflection signal and a first minor deflection signal and an output being a first summed signal;
   a second summing circuit having inputs being a second major deflection signal and a second minor deflection signal and an output being a second summed signal;
   a first pincushion correction module having inputs being said first and second summed signals and outputs being first and second corrected summed signals;
   a second pincushion correction module substantially identical to said first module, said second module having inputs being said first and second major deflection signals and outputs being first and second corrected major deflection signals;
   a first inverter means for inverting said first corrected major deflection signal;
   a second inverter means for inverting said second corrected major deflection signal;
   a third summing circuit having inputs being said first inverted corrected major deflection signal and said first corrected summed signal and an output being a first corrected minor deflection signal; and
   a fourth summing circuit having inputs being said second inverted corrected major deflection signal and said second corrected summed signal and an output being a second corrected minor deflection signal.

* * * * *